L. E. WATERMAN.
TWO-ROW CULTIVATOR.
APPLICATION FILED NOV. 15, 1915.

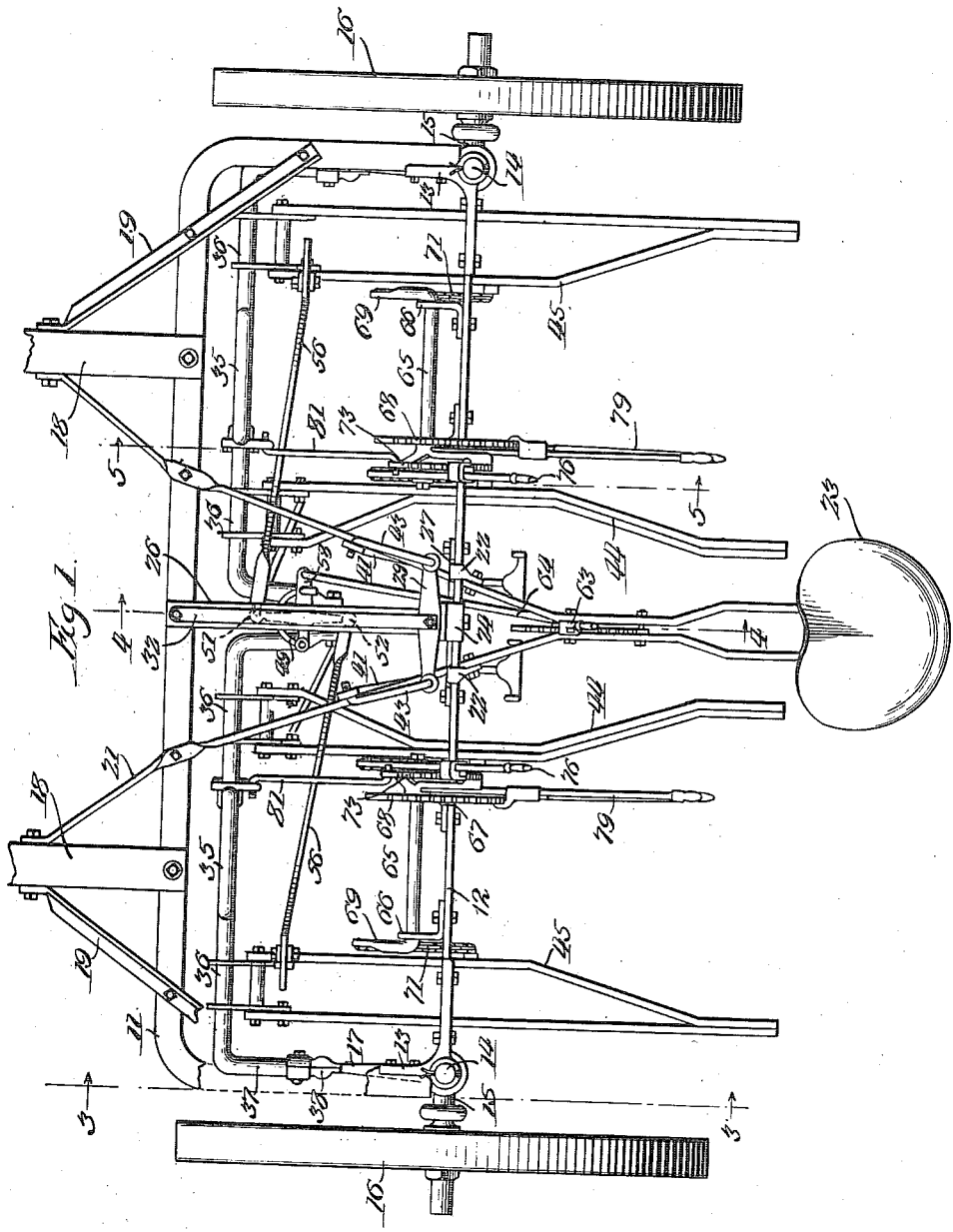

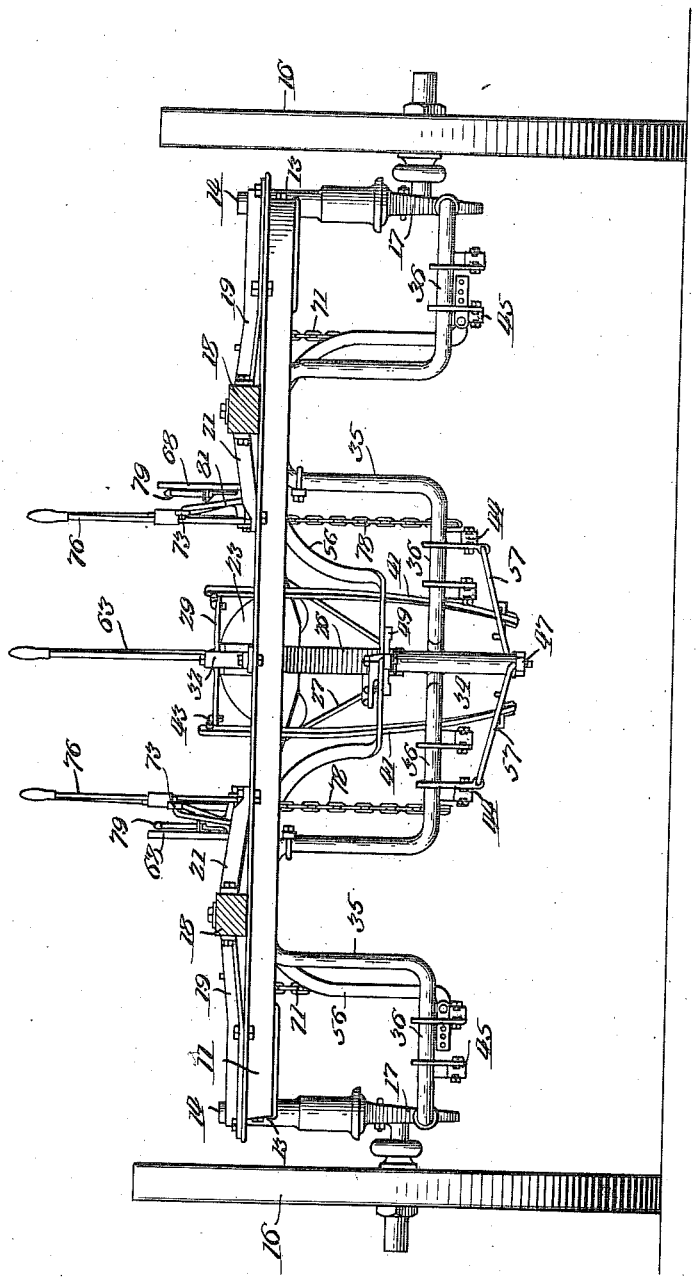

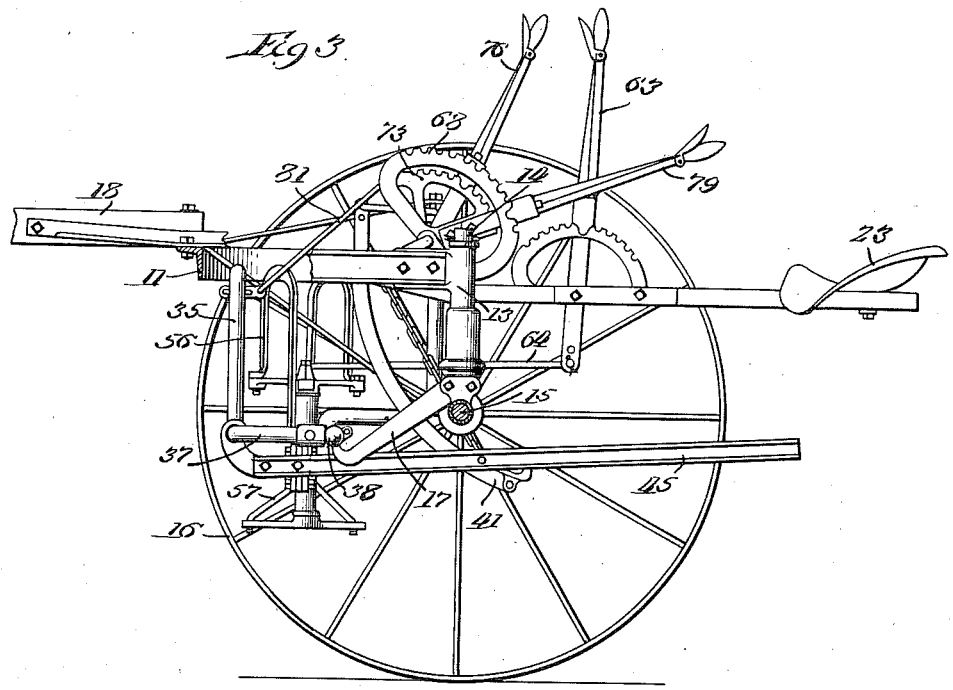

1,279,049.

Patented Sept. 17, 1918.
5 SHEETS—SHEET 4.

Inventor:
Lewis E. Waterman
By Pond & Wilson
Attys.

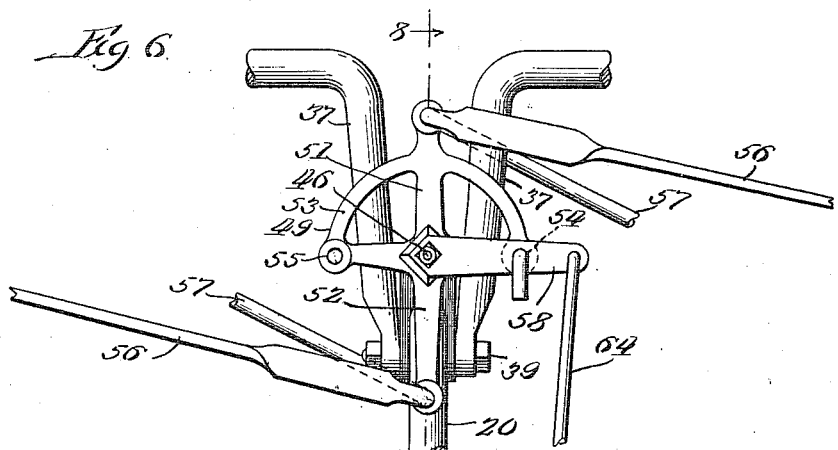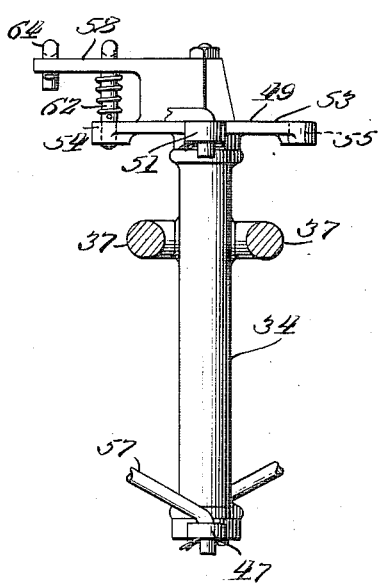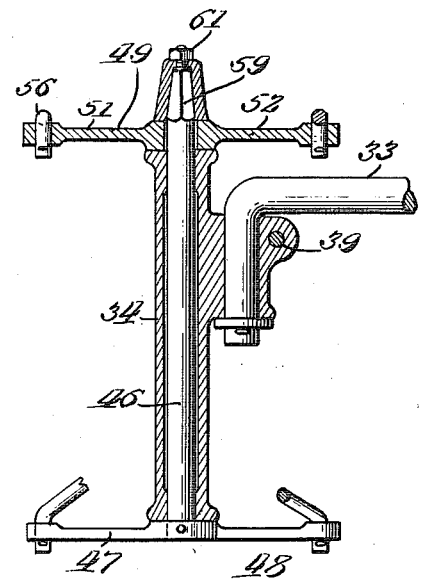

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

TWO-ROW CULTIVATOR.

1,279,049.  Specification of Letters Patent.  Patented Sept. 17, 1918.

Application filed November 15, 1915. Serial No. 61,622.

*To all whom it may concern:*

Be it known that, LEWIS E. WATERMAN, a citizen of the United States, residing at Rockford, in the county of Winnebago and State of Illinois, have invented certain new and useful Improvements in Two-Row Cultivators, of which the following is a specification.

This invention relates in general to cultivators and has more particular reference to those known as two-row cultivators adapted for simultaneously cultivating a plurality of rows of growing plants. The invention relates more specifically to a type of two-row cultivator described in Patent No. 1170584 granted Feb. 8, 1916, in which carrying wheels are mounted to shift about vertical axes so that the cultivator may be angled laterally with respect to the line of draft, and in which the wheels are connected and maintained in parallelism by arches of novel construction to which cultivating devices are attached and through means of which they are raised and lowered and shifted laterally in unison with the wheels.

One of the primary objects of this invention is to provide in a cultivator of the character described, improved means for adjusting and controlling the cultivating devices whereby to facilitate the control and permit various adjustments to be easily and readily effected.

My invention also contemplates the provision of novel means for shifting laterally the cultivating devices of which two pairs are employed in two-row cultivators, the cultivating devices of each pair being arranged to flank the sides of one row of plants. In this regard my invention provides for both laterally adjusting each pair of cultivating devices as a unit for the purpose of following differently spaced rows and adjusting the cultivating devices of each pair laterally toward and away from each other so as to cultivate more or less closely to the plants. To this end I have provided means for effecting these adjustments, from the operation of a single lever or the like that operates an adjusting and control mechanism which in turn is connected with the several cultivating devices and is itself capable of adjustment of its parts to two set positions, these latter controlling or determining whether the cultivating devices of each pair will be shifted laterally as a unit or independently relatively to each other when said lever is operated.

Another object of my invention is to provide an improved means for shifting laterally the beam-supporting arch structure and wheels when it is desired to dodge obstacles in the path of cultivation or to guide the cultivator to the left or right in following irregular rows.

A further object is to provide improved means for raising and lowering the cultivating devices, by which the cultivating devices of each pair may be adjusted vertically in unison or separately, as occasion requires.

Other objects and attendant advantages will be readily apparent as the invention becomes better understood by reference to the following description when considered in connection with the accompanying drawings, wherein I have illustrated one practical embodiment of my invention, and in which—

Figure 1 is a plan view of a two-row cultivator embodying my improvements;

Fig. 2 is a front view of the cultivator;

Figure 5:
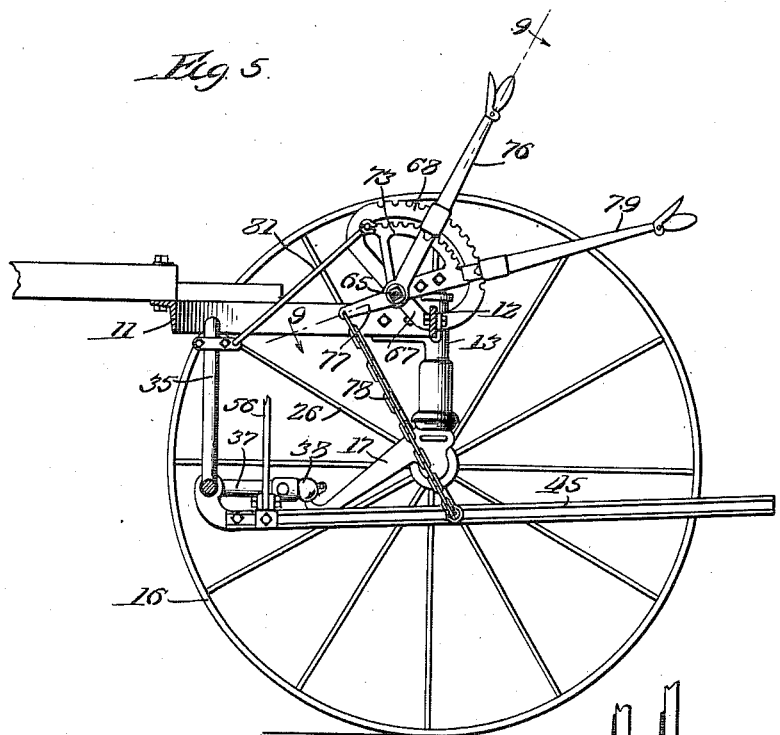
Figure 9:
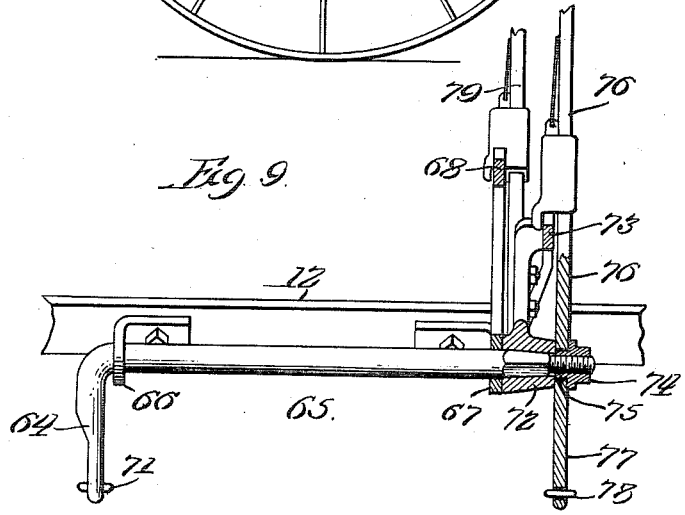

Figs. 3, 4, and 5 are vertical cross sectional views through the cultivator taken on the lines 3—3, 4—4, and 5—5, respectively of Fig. 1;

Fig. 6 is an enlarged fragmentary plan view of the cultivator beam adjusting or controlling device;

Fig. 7 is a front view thereof;

Fig. 8 is a vertical sectional view through said device taken on the line 8—8 of Fig. 6; and Fig. 9 is a sectional view taken on the line 9—9 of Fig. 5.

Referring to the drawings it will be observed that the frame of the cultivator comprises a U-shaped angle member 11 forming front and side portions of the frame, a rear cross bar 12, and supporting brackets 13 to which the ends of the members 11 and 12 are bolted and which are shaped to provide journal bearings on vertical axes in which standards 14 are journaled. These standards are provided at their lower ends with axles 15 upon which supporting wheels 16 are mounted, and are also provided with forwardly and downwardly extending arms 17 connected together by means of an arch structure described more fully hereinafter, which holds the wheels in parallel relation. By moving this arch structure laterally, the arms 17 and consequently the wheels will be swung laterally. A pair of poles or tongues 18 bolted to the front portion of the frame member 11, are braced at their outer sides by angle bars 19 and at their inner sides by bars 21 which latter converge rearwardly from the front portion of the frame and are secured by brackets 22 to the cross-bar 12 and project rearwardly from the frame constituting seat-supporting bars for the driver's seat 23, which it will be seen is fixedly mounted with respect to the frame. Suitable draft attachments may be secured to the poles or the frame.

An upstanding bracket 24 bolted medially to the cross-bar 12, provides a supporting bearing for the upper end of the spindle 25 of a crank member designated in general by the reference character 20. Referring to Fig. 4, it will be noted that the crank has a bearing at its lower end in an inclined brace bar 26 secured at its rear end to a bracket 27 fixedly connected to and depending from the cross-bar 12 and at its forward end connected to the front frame portion 11, and is shaped with a square upper end fitting into a square hub 28 of a rock lever 29 mounted on the top of the bracket 24. The crank spindle 25 is held in connection with the said rock lever by a nut 31 threaded onto the reduced end of the spindle, the latter being further braced by a rod 32 connected at its front end to the frame member 11 and interposed at its rear end between the nut 31 and hub 28. The forwardly extending arm 33 of the crank member 20 is provided with a down-turned outer end journaled in the shorter sleeve bearing of a bracket 34 which is shaped to provide a pair of sleeve bearings. A cotter pin through the lower end of the down-turned crank arm holds the bracket 34 against displacement from said arm.

The bracket 34, while serving as the means for supporting an adjusting and control device to be described hereinafter, also serves as the medium through which beam-supporting arches are connected to the crank arm 33. These arches, two in number, similar in construction, and designated in general by reference character 35, are shaped to provide horizontal beam-supporting portions 36 and rearwardly extending ends 37 pivotally and coaxially connected at their extremities to the arms 17 and bracket 34. The pivotal connection between the arches and arms 17 is preferably established through the agency of ball and socket joints 38, while the pivotal connection with the bracket 34 is by means of a bolt 39. It will thus be apparent that the supporting wheels are connected and held in parallel relation through the medium of an arch structure comprising a pair of arches connected to the arm of the crank member 20, and that by rocking the crank member, the arches, and consequently the carrying wheels, will be shifted laterally in unison.

Foot-operated means for rocking the crank member 20 consists of pendent levers 41 pivoted intermediate their ends at 42 to the seat bars 21 and pivotally connected at their upper ends by links 43 to the outer ends of the rock lever 29. The lower ends of the levers 41, arranged in convenient relation to the seat 23 are provided with foot stirrups so that the driver may, by pressing forwardly on either lever, rock the crank member to effect shifting of the beam-supporting arches and the wheels laterally in either direction.

The cultivating tools or devices may be of any preferred or conventional type adapted to be arranged in pairs for two-row cultivation. In the present instance, I have shown for purpose of illustration merely, two pairs of cultivator beams, each including inner and outer beams 44 and 45 respectively, pivotally and slidably attached at their forward ends to the horizontal portions 36 of the arches 35 so that the rear ends of the beams may be raised and lowered with respect to their forward ends and the beams moved freely, laterally on the arches. Means for maintaining the arches in upright position and the beams in a substantially horizontal position and for swinging the arches on their pivots 37 and 38 to effect raising and lowering of the beams will be described hereinafter.

In the operation of two-row cultivators, it is desirable to adjust each pair of cultivating devices as a unit toward and away from each other for the purpose of accommodating the devices to varying widths of rows and also to adjust the cultivating devices of each pair toward and away from each other to effect more or less close cultivation to the rows of plants without changing the relation of the pairs of cultivating devices with respect to the width of rows. I have provided novel means for effecting these adjustments by the operation of a single hand lever. This means consists of an adjusting and control device mounted upon the bracket 34 so as to move with the crank member 20 and shiftable between two relatively reversed positions, and connections from said device to the several cultivating beams arranged so that the operation, by said single hand lever, of the device when set to one position will adjust the beams in the manner first described above, and, when set to another position, will adjust the beams in the manner last described above. Referring particularly to Figs. 6, 7, and 8, this adjusting and control mechanism comprises a rock-shaft 46 journaled in the forward sleeve of the bracket 34, forwardly and rearwardly extending arms 47 and 48 in the form of a rocker-plate fixedly secured to the lower end of the shaft 46, another rocker plate designated in general by reference character 49 loosely mounted on the upper portion of a shaft 46 and shaped to form forwardly and rearwardly extending arms 51 and 52, respectively, and an arcuate portion 53, the ends of which terminate at points diametrically opposite the axis of the shaft 46 and are provided with apertures 54 and 55. The arms 51 and 52, arranged in the same vertical plane with the arms 47 and 48, are pivotally connected with the outer beams 45 through the agency of arched links 56. Viewing Figs. 1 and 6, it will be noted that the arm 51 is connected to the outer right hand beam and that the arm 52 is connected to the outer left hand beam, the inner right and left hand beams being connected by links 57 to the arms 47 and 48, respectively. The shaft 46 is rocked by means of an arm 58 shaped at one end to fit the squared end 59 of the shaft 46 and held in engagement therewith by a nut 61 threaded onto the reduced end of said shaft. A latch connection is established between the arm 58 and the rocker-plate 49, said connection as herein shown comprising a spring pressed latch-pin 62 mounted in the arm 58 and adapted to be engaged in either of apertures 54 or 55, the latchpin being shown engaged with aperture 54. A hand lever 63 pivoted intermediate its ends between the seat bars 21 and provided with a latch and segment connection with the frame, is connected at its lower end by means of a link 64 to the outer end of the arm 58.

When the several elements of the beam-adjusting and control device are positioned as shown in the drawings, upon swinging the hand lever 63 forwardly the shaft 46 will be oscillated in a clockwise direction, viewing Figs. 1 and 6, so as to shift each pair of cultivator beams as a unit outwardly on the arch portions 36. Thus the operator may adjust each pair of cultivating devices laterally as a unit without changing the relative relation of the cultivating devices of each pair, to accommodate the cultivating devices to wider rows of plants or to narrower rows.

It will be noted that when the beam-adjusting and control device is operated by the hand lever 63 as just described, the connections 56 and 57 of each pair of beams are connected to the control device at a common side of its pivot axis, thereby causing each pair of beams to be moved laterally as a unit for the purpose mentioned. When now it is desired to adjust the individual cultivator beams of each pair toward and from each other for cultivating more or less closely to the rows, one of the beam connections of each pair is moved to the opposite side of the pivot axis of said control device and locked in such position with respect to said device so that the connections 56 and 57 of each pair connect with the device on opposite sides of its pivot axis. Consequently when the device is oscillated by the hand lever 63 the cultivator beams of each pair will be moved in opposite directions, that is, toward and away from the row of plants. This adjustment of the control device whereby certain of the beam connections are reversed from one to the other side of the pivot axis of the device, is effected by moving one of the rocker plates a half revolution with respect to the other and then locking the plates in this adjusted position. In the present instance, the upper rocker plate 49 is adjusted a half revolution with respect to the lower rocker plate. This is accomplished, viewing Figs. 6 and 7, by withdrawing the latch pin 62 from the aperture 54 and then swinging the plate 49 by hand a half revolution in a clockwise direction viewing Fig. 6, until the latch pin engages in the aperture 55. By this adjustment the beam connections 56 will have been moved from their original positions to opposite sides of the shaft 46 so that considering either pair of cultivator beams, its connections 56 and 57 will be connected with the control device on opposite sides of its pivot axis so that when such device is now adjusted the beams of each pair will be moved toward and from each other. During the reversing movement just mentioned, of the rocker-plate 49 the adjusting lever 63 may remain stationary, thereby holding the beams attached to the connections 57 stationary, although if desired the hand lever 63 may be manipulated to swing the arm 58 in a counterclockwise direction viewing Fig. 6, so that the latch pin 62 will enter the aperture 55 before the rocker plate 49 has been adjusted a complete half revolution, thus lessening the distance said rocker plate 49 must be adjusted by hand. It is, of course, understood that in this latter example after the upper and lower rocker plates have been connected in the newly adjusted position the arm 58 will be swung back to normal position by the hand lever 63. When, now, the lever 63 is swung forwardly, the rocker-plate 49 and the shaft 46 will be oscillated in a clockwise direction and the cultivator beams of each pair moved toward each other, and when lever 63 is swung rearwardly, the cultivator beams of each pair will be moved away from each other. It will thus be seen that this mechanism not only adjusts the cultivating devices laterally in both of the manners described, but, according to the position in which it is itself adjusted or set, is controlling or determinative of the particular manner in which the cultivating devices shall be adjusted.

It will be here noted that the cultivating devices are maintained in fixed relation to the arches 35 at all times by the adjusting and control device above described when the latter is not being operated, regardless of lateral shifting of the arches by the foot levers 41, since the said adjusting device is connected directly to and movable with the crank member 33 which shifts the said arches.

Each arch 35 and a pair of cultivating devices associated therewith are adapted to be adjusted vertically by individual means and for this purpose I have provided an adjustable hand lever for rocking the arch on its pivots to effect raising and lowering of the cultivator beams of each pair in unison in such manner that the beams are maintained substantially horizontal during such movement and their outer or rear ends elevated higher than their front ends when the beams have been moved to their uppermost position. I have also provided a lever-adjusting means by which the beams of each pair may be moved vertically with respect to each other so that they may be set to cultivate at different depths, when such operation is desired. Since the adjusting devices for the two pairs of beams are of similar construction, a description of one will suffice. Referring particularly to Figs. 5 and 9, 65 designates a shaft that is journaled adjacent to its ends in brackets 66 and 67 which are bolted to the cross-bar 12, the latter bracket being shaped to form a notched segment 68. The outer end of the shaft 65 is turned forwardly in the form of an arm 69, the end of which is connected by means of a chain 71 with the outer beam 45. The inner end of the shaft 65 is squared to fit the squared hub 72 of a notched segment bracket 73. A nut 74 screwed onto the threaded reduced inner end of the shaft 65 holds the segment bracket 73 in position and the shaft against displacement outwardly, and is provided with a reduced inner end 75 upon which is loosely mounted a hand lever 76 provided with a suitable spring latch connection with the segment 73. The lever 76 is formed with a forward extension or arm 77 having the general direction of the arm 69, which extension is connected at its forward end by a chain 78 to the inner cultivator beam 44. A hand lever 79 fixedly secured to the segment bracket 73 is equipped with a suitable spring latch connection with the stationary segment 68. Connection between the segment bracket 73 and the arch 35 is established by means of a link 81 in the manner shown in Fig. 5. Viewing this figure, it will be noted that the arch 35 is maintained in upright position by means of the link 81, segment bracket 73 and hand lever 79 which engages the fixed segment bracket 68 and is rigidly connected with the segment bracket 73, so that a positive operating connection is established between the hand lever 79 and the arch. Upon swinging the hand lever 79 forwardly, the arch 35 is swung downwardly on its pivots so as to effect lowering of the forward ends of its cultivator beams. Simultaneously with this lowering of the beams by the arch, the shaft 65 is rocked in a counterclockwise direction, viewing Fig. 5, so as to swing the arms 69 and 77 downwardly, thereby slightly lowering in unison the rear ends of the cultivator beams with respect to their forward ends, so that the beams when in working position are substantially horizontally disposed. Should it be desired to raise or lower the outer cultivator beam with respect to the outer beam, the hand lever 76 may be adjusted on the segment 73, thereby swinging the beam 45 vertically on its pivoted end without disturbing the position of the remaining beam-adjusting elements.

It is believed that the foregoing conveys a clear understanding of my invention and its principles of operation, and it should be understood that I do not limit myself to the particular embodiment illustrated, since various changes in construction may be resorted to without departing from the spirit and scope of the invention as expressed in the appended claims.

I claim:

1. In a two-row cultivator, the combination of two pairs of cultivating devices mounted with capacity for individual independent lateral movement, a common operating lever, and an adjusting and controlling mechanism intermediate said cultivating devices and said common operating lever, said last named mechanism including a pair of relatively reversible rocker-plates having link connections to the outer and inner cultivating devices of the two pairs, respectively, whereby in one position of said rocker-plates the two pairs of cultivating devices are shifted as units toward or from each other, and in the reversed position of said rocker-plates the individual devices of each pair are shifted toward or from each other.

2. In a cultivator, the combination of two pairs of cultivating devices mounted with capacity for individual lateral movement, an adjusting and controlling device pivotally mounted so that parts thereof on opposite sides of its axis move laterally in opposite directions when the device is oscillated, connections between one of the cultivating devices of each pair and said controlling device on one side of its axis and between the other cultivating devices and said controlling device on the opposite side of its axis, means for oscillating said controlling device so that the cultivating device of each pair will be moved toward and away from each other, said connections being adjustable so that those of each pair of cultivating devices will be connected to the controlling device on a common side of its axis whereby when said device is oscillated each pair of cultivating devices will be moved as a unit toward and from each other.

3. In a cultivator, the combination of two pairs of cultivating devices mounted with capacity of individual lateral movement, and a control device having forwardly and rearwardly extending parts movable about an upright axis intermediate their extremities, a connection between the cultivating devices of one pair and the forward parts and between the other pair and the rear parts, means for oscillating said parts in unison whereby the pairs of cultivating devices will be moved as units toward and from each other, and means for allowing the connection of one of the cultivating devices of each pair to be changed to either the forward or rear part, as the case may be, so that when the parts are again oscillated the cultivating devices of each pair will be moved toward and from each other.

4. In a cultivator, the combination of a laterally movable arch structure, a pair of cultivating devices for each row mounted on the arch structure so as to be independently laterally movable thereon, a device mounted so as to move laterally with the arch structure and having relatively movable parts adapted to be locked together in any of a plurality of different relative arrangements, connections between these parts and the cultivating devices, and an adjusting lever connected to said device for operating the same to move said cultivating device laterally upon and with respect to the arch stucture in a manner determined by the particular relative arrangement of said relatively movable parts.

5. In a two-row cultivator, the combination of a pair of cultivating devices for each row mounted with capacity for individual lateral movement, a device pivotally mounted intermediate its ends, connections between the cultivating device of one pair and said device at one side of its axis and between the cultivating devices of the other pair and said device at the opposite side of its axis so that when said device is oscillated each pair of cultivating devices will be moved as a unit laterally toward and from each other, and means for allowing one of the cultivating devices of each pair to be connected to the opposite sides of said axis, so that when the device is oscillated the cultivating devices of each pair will be relatively moved toward and from each other.

6. In a two-row cultivator, the combination of a pair of independently laterally shiftable cultivating devices for each row, and an adjusting and control device having oscillatory parts and connections therefrom to said cultivating devices normally holding the same in fixed relative relation, means for oscillating said parts to shift each pair of cultivating devices laterally as a unit, and means for effecting an adjustment of said oscillatory parts so as to change the relative relation of said connections to cause the cultivating device of each pair to be shifted laterally relatively to each other upon operation of the first named means.

7. In a two-row cultivator, the combination of a pair of independently laterally shiftable cultivating devices for each row, a pair of oscillatory members, and a single actuating device for oscillating said members in unison, said members being connected with the cultivating devices so as to shift each pair outwardly and inwardly in unison to accommodate them to different widths of rows, and said members being relatively adjustable to effect, upon operation of said actuating device, the shifting of the cultivating devices of each pair laterally toward and from each other so as to vary the distances therebetween.

8. In a two row cultivator, the combination of a pair of independently laterally shiftable cultivating devices for each row, and adjusting and control device and connections therefrom to said cultivating devices normally holding the same in fixed relative relation, said adjusting and control device being operable from a single operating member to move each pair of cultivating devices as a unit laterally toward and from each other and to shift the individual cultivating devices of each pair laterally toward and from each other.

9. In a two-row cultivator, the combination of a pair of independently laterally shiftable cultivating devices for each row, a pair of rocker-plates and connections therefrom to the cultivating devices whereby to shift the same laterally upon rocking the said plates, and means for rocking said plates in unison so as to shift each pair of cultivating devices as a unit, laterally toward and from each other, one of said plates and its connections being adjustable with respect to the other plate whereby upon rocking the plates in unison the individual cultivating devices of each pair will be shifted laterally toward and from each other.

10. In a cultivator, the combination of a frame, a laterally shiftable arch structure, a crank member mounted on the frame and connected at its free end with said arch structure and adapted to shift the same laterally cultivator beams attached to the arch structure so as to be independently laterally adjustable thereon, relatively adjustable members mounted so as to move laterally with the crank and connected with the beams so that they will be moved laterally with the arch structure, means for locking said members together, and a lever for moving said members while locked together to adjust the beams laterally on the arch structure, said members being relatively adjustable to change the operative effect of said lever in adjusting the beams laterally.

11. In a cultivator, the combination of a frame, a laterally shiftable arch structure, cultivator beams attached to the arch structure so as to be laterally adjustable thereon, relatively adjustable members connected to and movable with said arch structure and connected with the beams for holding them in fixed relative relation and against lateral movement with respect to the arch structure, and means for operating said members to adjust the beams laterally upon and with respect to the arch structure in a predetermined manner, said members being relatively adjustable to change the relative relation of the connections to the cultivator beams so that when said means is again operated to adjust said members the cultivator beams will be moved laterally on the arch structure in a different manner.

12. In a cultivator, the combination of a frame, a laterally movable arch, a crank member pivoted on the frame and connected at its free end to the arch, means for rocking the crank member so as to shift the arch laterally, cultivating devices adjustable laterally on the arch, a device for adjusting the cultivating devices laterally on the arch and mounted so as to move laterally therewith, said device including a pair of reversible elements connected to said cultivating devices to cause the same to be moved laterally upon and with respect to the arch in the same or different directions according to the relative arrangement of said elements, and an adjusting lever for actuating said device to thereby move the cultivating devices laterally in the manner determined by the arrangement of said elements.

13. In a cultivator, the combination of a frame, a laterally movable arch structure, a crank member pivoted on the frame and connected at its free end to the arch structure, means for rocking the crank member to shift the arch structure laterally, two pairs of cultivating devices attached to the arch structure in a manner to permit the cultivating devices of each pair to be independently laterally moved on the arch structure, a rock shaft mounted to move laterally with the arch structure, a pair of arms connected to and extending in opposite directions from the rock shaft, a connection between each of said arms and one of said cultivating devices, means for holding said rock shaft against rotation when the crank member is swung, so as to maintain the cultivating devices in fixed relative relation with respect to the arch structure, and for rocking said shaft to adjust the cultivating devices laterally on the arch structure, and means allowing said arms to be relatively adjusted to change the relative relation of the cultivating device connections so that upon again rocking the rock shaft the cultivating devices will be moved laterally on the arch structure in a different manner.

LEWIS E. WATERMAN.